United States Patent [19]

Nishimura

[11] Patent Number: 4,960,070

[45] Date of Patent: Oct. 2, 1990

[54] DEVELOPING APPARATUS

[75] Inventor: Matsuomi Nishimura, Ohmiya, Japan

[73] Assignee: Canon Kabushiki Kaisha, Tokyo, Japan

[21] Appl. No.: 373,580

[22] Filed: Jun. 30, 1989

[30] Foreign Application Priority Data

Jul. 1, 1988 [JP] Japan .............................. 63-164140
Jul. 1, 1988 [JP] Japan .............................. 63-164141

[51] Int. Cl.$^5$ ............................................ G03G 15/09
[52] U.S. Cl. ................................... 118/658; 355/251
[58] Field of Search ................ 118/658, 657; 355/251; 430/122

[56] References Cited

U.S. PATENT DOCUMENTS 4,833,504  5/1989  Parker et al. .................... 118/658 X

FOREIGN PATENT DOCUMENTS 56-133761  10/1981  Japan .

Primary Examiner—R. L. Moses
Attorney, Agent, or Firm—Fitzpatrick, Cella, Harper & Scinto

[57] ABSTRACT

A developing apparatus for developing an electrostatic latent image formed on a movable image bearing member includes a rotatable developer carrying member for carrying a developer into a developing zone where an image bearing member and the developer carrying member are faced and where the electrostatic latent image on the image bearing member is developed, a magnet stationarily disposed in the developer carrying member, wherein the magnet forms in the developing zone such a magnetic field that a peak position of a magnetic flux density of the magnetic field in a direction perpendicular to a surface of the developer carrying member is in the developing zone, and wherein a magnetic confining force in the perpendicular direction in the developing zone is so distributed that it is stronger downstream of a position where the image bearing member and the developer carrying member are closest with respect to a movement direction of the image bearing member than at the closest position.

30 Claims, 6 Drawing Sheets

DEVELOPING APPARATUS

FIELD OF THE AND RELATED ART

The present invention relates to a developing apparatus for developing an electrostatic latent image formed on an image bearing member in an image forming apparatus such as an electrophotographic copying machine, an electrophotographic laser beam printer, an LED printer, an LCS printer and a multi-stylus type electrostatic printer.

A type of developing apparatus is known wherein a layer of developer is formed on the developer carrying member in a thickness smaller than a minimum clearance between the developer carrying member and the image bearing member, and the developer is transferred from the layer to the image bearing member to develop the latent image thereon. Many of such developing apparatuses each comprise a stationary magnetic field generating member (magnet) and a developer carrying member of non-magnetic material rotated around the outer periphery of the magnetic field generating member. The developer carrying member is faced to the image bearing member. The developer is supplied onto the developer carrying surface and is carried thereon to a developing zone where it is faced to the image bearing member to develop the latent image.

Improvements are desired in the apparatus of the above-described type in the following points:

(1) Tailing in the visualized image:

Referring to FIGS. 1A and 1B, an enlarged view of a good visualized (developed) image is indicated by a reference 100 in FIG. 1A. FIG. 1B shows an enlarged view of an image 101 having tails, wherein developer particles (toner) are deposited in the form of tails 101A in a line or dots, extending in the direction opposite to the movement direction d of the image bearing member (the member to be developed).

(2) Scattered spots:

As shown in FIG. 1B, the developer particles are scattered in fine spots 101B around the visualized image 101.

These deteriorate the quality of the image, but appear more or less in the conventional developing apparatuses of the above-described type. Particularly when a so-called one component magnetic developer used as the developer, the above problems appear more remarkably.

SUMMARY OF THE INVENTION

Accordingly, it is a principal object of the present invention to provide a developing apparatus wherein the image deterioration due to the tails and the scattered spots is prevented.

It is a further object of the present invention to provide a developing apparatus which can faithfully develop the latent image to provide a sharp and high quality developed image.

Generally, in order to promote the transfer of the developer particles from the developer carrying member to the image bearing member, a magnetic field effective to erect the magnetic brush of the developer from the developer carrying surface is formed in the developing zone, so that the developer particles can be easily released from the developer carrying member. The inventor thought that the promotion of the release of the developer particles from the developer carrying member was a cause of the tails and the scattered spots. As a result of various investigations, it has been found that most of the developer particles forming the tails and the scattered spots are those which are transferred from the developer carrying member to the image bearing member in the latter part of the developing process. On the basis of the finding, the magnetic confining force in the direction perpendicular to the developer carrying member surface in the present invention is made larger at the downstream side of the position where the image bearing member and the developer carrying member are closest than at the closest position, by which such release of the developer particles from the developer carrying member as to cause the tails and scattered spots is constrained. In addition, the developer particles once deposited on the image bearing member as the tails and the scattered spots are more easily returned to the developer carrying member.

Here, the distribution shape of the perpendicular magnetic confining force around the periphery of the developer carrying member is not analogous to the distribution shape of the perpendicular magnetic flux density therearound.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 2:
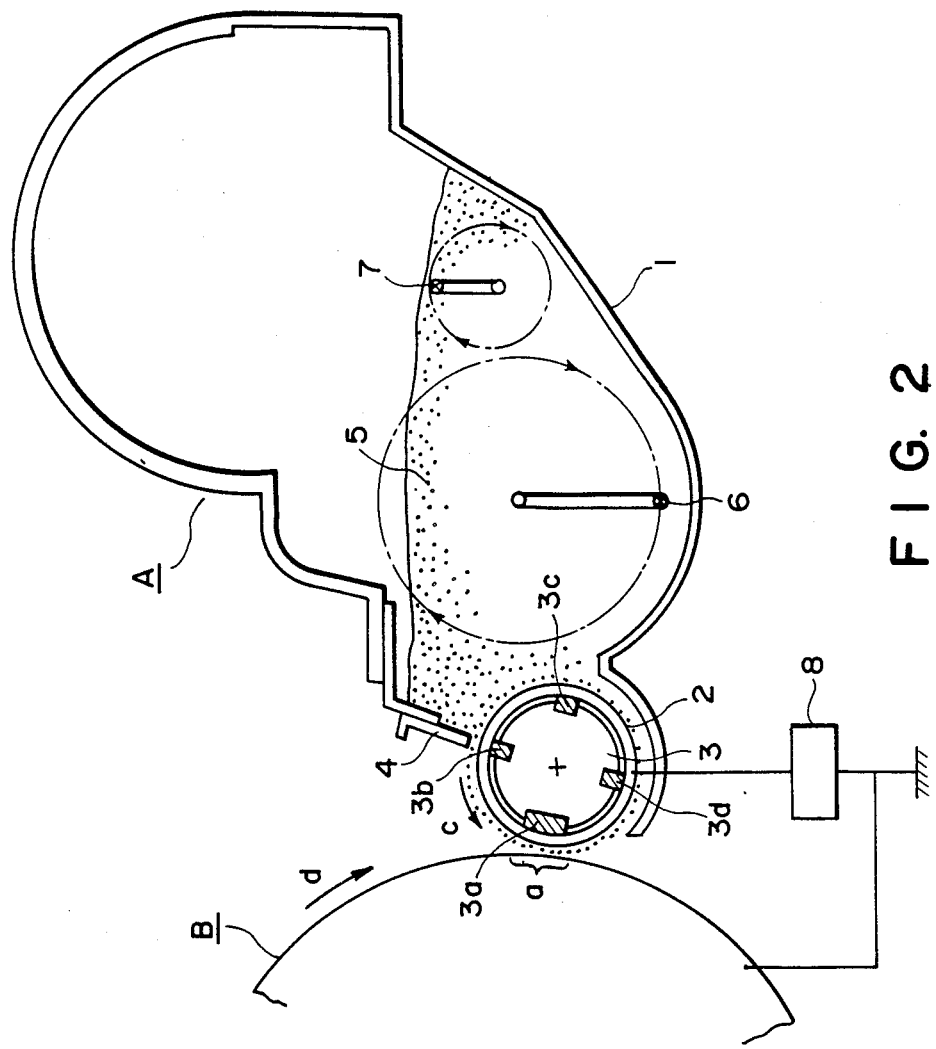
FIG. 2 is a sectional view of a developing apparatus to which the present invention is applicable.

Referring to FIG. 2, there is shown a developing apparatus using a one component magnetic developer, which does not contain carrier particles but contains magnetic toner. An image bearing member B such as an electrophotographic photosensitive drum to be developed by the developing apparatus, is designated by a reference character B. The image bearing member B is rotatable at a predetermined peripheral speed in a direction indicated by an arrow d. On the image bearing member B, an electrostatic latent image is formed by an unshown latent image forming means. The latent image is visualized sequentially with toner by a developing device A. The developed image is transferred onto a transfer material in an unshown transfer station, and the transferred image is fixed into a permanent image on the transfer material surface at an unshown image fixing station. The transfer material is discharged as a record (copy).

The developing apparatus A comprises a developer container 1, a developing sleeve (cylinder) functioning as the developer carrying member. The developing sleeve 2 is rotatably and horizontally supported at the front side of the developer container 1, and substantially a left half of its periphery is exposed outside the container, while substantially the right half thereof is in the container 1. The developing sleeve 2 is made of nonmagnetic material such as aluminum and stainless steel (SUS) and is rotatingly driven from an unshown drive transmitting system about an axis of the sleeve 2 in a direction C at a predetermined peripheral speed. The surface of the image bearing member B and the exposed surface of the developing sleeve 2 are faced with a predetermined small clearance (the minimum clearances 50–100 microns), and the facing portion constitutes a developing zone a. In the developing zone a, the toner is supplied from the sleeve 2 to the image bearing member so that the latent image is developed.

The developing apparatus further comprises a magnet roller 3 functioning as the magnetic field generating means contained within the developing sleeve 2. The magnetic roller is not rotatable, so that the developing sleeve 2 revolves around the roller 3. Magnets 3a, 3b, 3c and 3d are magnets providing magnetic poles at predetermined positions adjacent the periphery of the roller 3. The magnet 3a is disposed adjacent to the developing zone a and functions as a developing electrode. More particularly, the magnetic pole 3a formed a magnetic field effective to erect a magnetic brush of the developer on the surface of the sleeve 2 in the developing zone a. The peak of the magnetic flux density, in the direction perpendicular to the peripheral surface of the sleeve 2, of the magnetic field, that is the peak of the magnetic flux density effective to erect the magnetic brush on the surface of the sleeve 2, exists in the developing zone a.

The magnet 3b (cutting pole) functions to regulate the developer and is disposed adjacent a bottom edge of a developer layer regulating blade 4, the bottom edge being faced with a predetermined small clearance on the top part of the developing sleeve 2. The blade 4 is preferably made of magnetic material such as iron. Then, a magnetic field produced by the magnetic pole 3b is concentrated on the blade 4, and the concentrated magnetic field serves to form a thin layer of the magnetic developer (U.S. Patent No. 4,387,664). The developer layer thickness regulating member may be in the form of an elastic blade press-contacted to the sleeve 2 (U.S. Patent No. 4,458,627). Magnet 3c and 3d are disposed adjacent the right hand side and the bottom side of the developing sleeve 2, respectively, and function to convey the developer.

The one component magnetic developer 5 is contained in the container 1. The container is equipped therein with a developer stirring rod and an auxiliary stirring rod rotated in the directions indicated by arrows. The developer 5 in the container 1 is sufficiently stirred and mixed by the rotation of the stirring rod 6, and is conveyed toward the right half periphery of the developing sleeve 2. The auxiliary stirring rod 7 serves to move the developer present at the rear side of the container toward the stirring rod 6.

Substantially the right half of the periphery of the developing sleeve 2 is always in contact with the developer 5 in the container 1 so as to be supplied with the developer, and the developer adjacent to the developing sleeve surface is attracted on the sleeve surface 2 and is retained thereon by the magnetic force provided by the magnet roller 3. The retained layer of the developer is conveyed by the rotating sleeve 2, and the thickness thereof is regulated by passing through the clearance between the sleeve 2 and the blade 4, by which it is regulated into a thin coating layer having a uniform thickness. The thin layer is carried by the continuing rotation of the sleeve 2 into the developing zone a. In the developing zone, the developer carried on the developing sleeve 2 is transferred and deposited onto the image bearing member correspondingly to the latent image pattern of the image bearing member B by the movement of the surface of the image bearing member B through the developing zone a, the latent image is sequentially visualized (developed).

The developer layer thickness regulating member 4 regulates the developer layer into a thickness which is smaller than the minimum clearance between the sleeve 2 and the image bearing member B in the developing zone a. The sleeve 28 is supplied from the voltage source 8 with an alternating voltage in the form of a sine wave, rectangular wave or triangular wave or the like or such an AC voltage superposed with a DC voltage, by which an alternating electric field is formed in the developing zone a. The AC voltage has a peak-to-peak voltage (Vpp) which is preferably larger than an absolute value of a difference between the maximum potential of the latent image and a minimum potential thereof, and the DC voltage (the center of the alternating bias voltage) is preferably between the maximum potential and the minimum potential. Further, the maximum and minimum levels of the bias voltage is preferably outside the range between the maximum potential and the minimum potential of the latent image. By the application of such a bias voltage to the sleeve 2, the developer vibrates in the developing zone a to develop the latent image. By the vibrating or alternating electric field, the developer repeats deposition to and release from the image bearing member, but finally an amount of toner corresponding to the potential of the latent image remains on the image bearing member (U.S. Pat. No. 4,292,387).

In a regular development wherein the toner is deposited on the maximum potential portion of the latent image, the toner is charged to the polarity opposite to that of the latent image, whereas in a reverse-development wherein the toner is deposited to the minimum potential portion of the latent image, the toner is charged to the same polarity as the polarity of the latent image potential. When one component developer is used, the toner is triboelectrically charged to the proper polarity described above by the friction with the sleeve 2.

The alternating electric field functions to promote the release of the developer from the sleeve, and therefore, the above-described tails and scattered spots are relatively easily produced. Overcharged toner particles, insufficiently charged toner particles, the toner particles charged to the polarity opposite to the desired polarity are difficult to release from the image bearing member once they are deposited on the background of the latent image, even by the alternating electric field, and therefore, they tend to remain as the tails and scattered spots. The present invention is effective to solve these problems.

The developer not consumed for the development is returned into the container 1, being carried on the developing sleeve surface which continuously rotates.

The visualized image on the image bearing member B is sequentially transferred onto a transfer material through an unshown transfer station.

Figure 3:
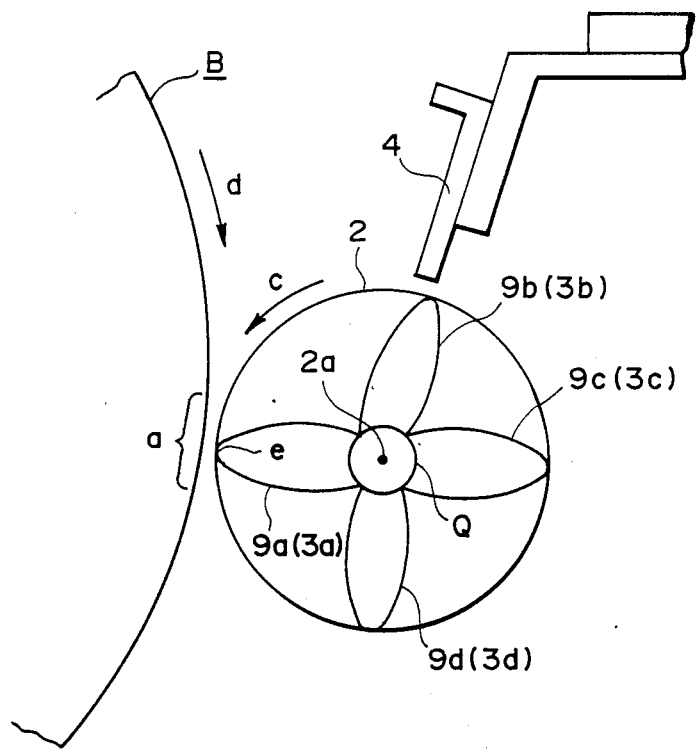
FIG. 3 shows a density distribution of a perpendicular component of the magnetic flux.

FIG. 3 shows a distribution, along the circumferential periphery of the developing sleeve, of a component of the magnetic flux density on the sleeve surface in the direction perpendicular to the surface of the developing sleeve (perpendicular component magnetic flux density or perpendicular magnetic flux density), corresponding to the stationary magnetic poles 3a, 3b, 3c and 3d of the magnet roller 3. That is, designated by references 9a, 9b, 9c and 9d are density distributions of the perpendicular component magnetic flux of the developing pole 3a, the cutting pole 3b, the conveying poles 3b and 3d. Designated by reference Q represents 0 Gauss line.

The distribution 9a is the distribution of the perpendicular magnetic flux density effective to erect the developer on the sleeve surface in the developing zone, and has a peak e in the developing zone a.

Figure 4:
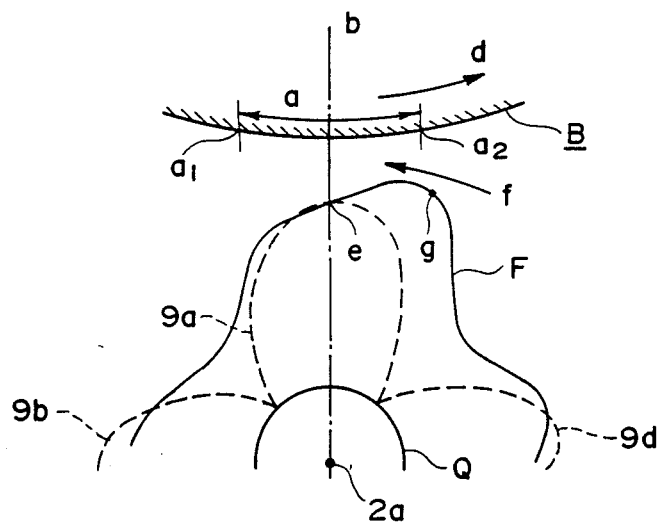
FIG. 4 shows a density distribution of the perpendicular magnetic flux in an embodiment of the present invention and a distribution of the perpendicular magnetic confining force, according to an embodiment of the present invention.
Figure 7:
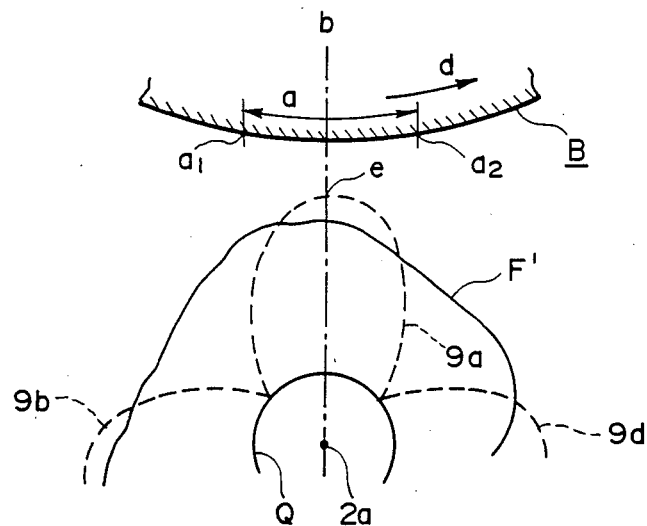
FIG. 7 shows a density distribution of the perpendicular component of the magnetic flux and a distribution of a perpendicular magnetic confining force in a conventional, apparatus.

FIG. 4 shows the perpendicular magnetic flux density in the neighborhood of the developing zone a and a distribution F of a magnetic confining force in the perpendicular direction. Designated by a reference Q indicates 0 magnetic flux density and 0 magnetic confining force. The magnetic confining force is the force for magnetically attracting the developer particles toward the axis 2a of the sleeve 2. As will be understood from this FIG., the configuration of the magnetic confining force distribution along the circumference of the sleeve is not analogous to the configuration of the perpendicular flux density distribution along the circumference. When the magnetic confining force is larger downstream of the position (line b) where the sleeve 2 and the image bearing member b are closest with respect to the peripheral movement direction d of the image bearing member than on the line b, good developed images free from the tails and scattered spots are provided. It has been found in this embodiment that sharp and high quality images without defect can be produced, when the configuration of the distribution of the magnetic confining force along the circumferential of the sleeve 2 is as shown by the reference F in FIG. 4, in other words, when the magnetic confining force is stronger at the downstream side f of the developing zone a than at the peak position e of the magnetic flux density 9a by the developing pole 3a. In the example illustrated, the peak position e of the magnetic flux density 9a is on a line b connecting the axis of the image bearing member B (geometrical center of the drum) and the axis 2a of the developing sleeve 2. FIG. 7 shows an example of the distribution F' of the perpendicular magnetic confining force along the circumferential periphery of the sleeve in the developing zone a in a conventional developing apparatus of the same type.

Figure 1A:
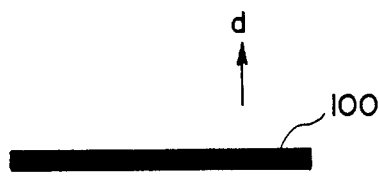
FIG. 1A illustrates a good image in an enlarged scale.
Figure 1B:
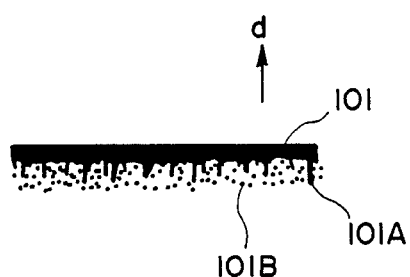
FIG. 1B illustrates a poor image in the enlarged scale.

When a magnet pole having a magnetic confining force profile as shown in FIG. 7 is used, it has been confirmed that images with tails and scattered spots tend to be produced (FIG. 1B).

Thus, it has been confirmed that sharp images without tails and scattered spots are stably produced when the perpendicular magnetic confining force is weaker in a side downstream of a peak position e of the perpendicular magnetic flux density 9a by the developing pole 3a with respect to a movement direction of the image bearing member than at the peak position e. This means that the tails, scattered spots and line thinning are prevented when the forces imparted to the individual developer particles in the direction perpendicular to the sleeve surface satisfy the above.

When the configuration of the perpendicular magnetic confining force distribution or profile F is as shown in FIG. 4, the perpendicular confining force is stronger in the downstream side f of the position where the image bearing member B and the developing sleeve 2 are closest in the developing zone, and therefore, the developer particles receive stronger forces toward the developing sleeve 2 in the downstream side f. As a result, in the downstream side f of the developing zone a, the chains of the developer particles by the developing pole 3a is immediately attracted to the developing sleeve 2 side. Therefore, excessive developer particles attributable to the tails, scattered spots and thinning of the image are difficult to reach the image bearing member B. On the other hand, in the upstream side of the closest position in the developing zone a, the developer particles which can be a cause of the tails, scattered spots and the thinning and which has been deposited on the image bearing member are retracted back to the developing sleeve by the magnetic confining force. It is considered that this is the reason why the tails and scattered spots are prevented.

The foregoing description has been made with respect to the case wherein the peak position e of the perpendicular magnetic flux density by developing pole 3a is on a line b connecting the rotational axis of the image bearing member B and the rotational axis of the sleeve 2. But the same applies when the peak position E is slightly shifted toward upstream or downstream of the line b in the developing zone a. In other words, sharp developed images without tails, scattered spots and thinning can be stably produced when the perpendicular erection magnetic confining force F is stronger in the downstream side of the position where the image bearing member and the developing sleeve is closest, that is, the line b connecting the axes of the image bearing member B and the developing sleeve 2. A further improved embodiment will be described.

Figure 5:
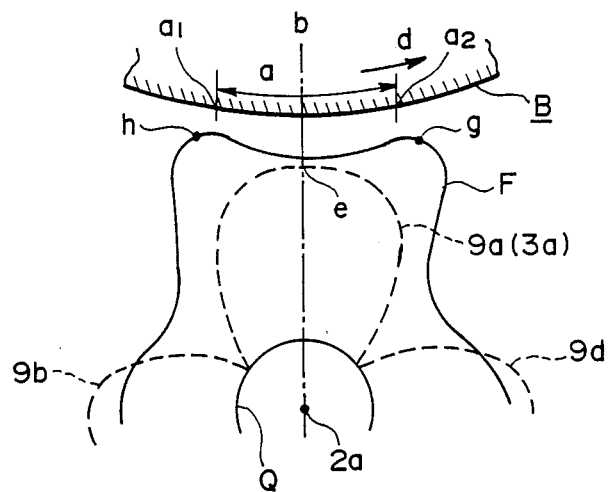
FIG. 5 shows a density distribution of the perpendicular component of the magnetic flux and a distribution of the perpendicular magnetic confining force in another embodiment of the present invention.

Referring to FIG. 5, the perpendicular magnetic confining force F is larger upstream and downstream of the line b on which the image bearing member and the sleeve are closest with respect to the movement direction of the image bearing member than at the line b.

When the magnetic confining force distribution adjacent the developing zone a is as shown in FIG. 5 by a reference F, the magnetic confining force is strong in the vicinity of the position where the developing action starts, and therefore, movement of the one component magnetic developer on the developing sleeve 2 toward the image bearing member B is restrained by the magnetic confining force, so that the amount of the developer more than necessary is prevented from being deposited on the image bearing member B. In other words, the function is provided to restrain the movement of the developer to the image bearing member B more than necessary, which can be a cause of the tails and scattered spots.

In the neighborhood of the position where the developing action terminates, the magnetic confining force is strong, and therefore, the developer deposited on the image bearing member B more than necessary is retracted back to the developing surface 2. As a result, sharp and high quality images which are faithful to the latent images and therefore the original can be produced without tails and scattered spots.

On the other hand, if the magnetic confining force is too strong adjacent the central portion of the developing zone A (line b), the restraint to the developer is so strong that the image density is decreased too much. Therefore, adjacent the center of the developing zone, it is preferable that the magnetic confining force is weaker than adjacent the development starting region and than adjacent the development ending position.

The best results were obtained when the distribution configuration F of the magnetic flux confining force is substantially symmetrical about a line b where the image bearing member b and the developing sleeve 2 are closest.

Figure 6:
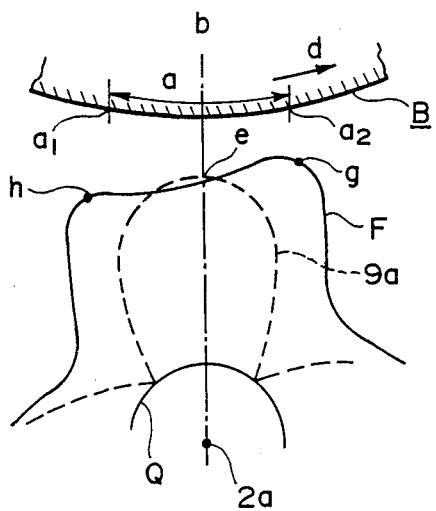
FIG. 6 shows a density distribution of a perpendicular component of the magnetic flux and a distribution of a perpendicular component of the magnetic confining member in a further embodiment of the present invention.

Even if, however, the perpendicular magnetic confining force distribution is not symmetrical about the line b, as shown in FIG. 6, the tails and scattered spots are prevented from occurring, if the magnetic confining force is larger at the upstream and downstream sides of the line b than on the line b.

In FIGS. 5 and 6, the peak e of the perpendicular magnetic flux density $9a$ is on the line b, but this is not limiting, and it may be slightly shifted toward upstream or downstream of the line b if the peak e is in the developing zone a. In any case, the magnetic confining force is stronger in the upstream and downstream sides of the peak position e with respect to the movement direction of the image bearing member than at the peak position e of the magnetic flux density.

In FIGS. 4, 5 and 6, the position of a peak g of the magnetic confining force in the downstream side of the line b is preferably adjacent a finishing end $a_2$ in the developing zone. More particularly, the peak position g is in the region between a point away from the finishing end $a_2$ toward upstream and downstream by $l_2 \times (\frac{1}{3})$, respectively, where $l_2$ is a distance from the line b to the end $a_2$. In FIGS. 5 and 6, the position of the peak h of the magnetic confining force in the upstream side of the line b is preferably adjacent to the development starting end $a_1$. More particularly, the peak h is preferably in the region between a point away from the starting end $a_1$ toward upstream and downstream by distance $l_1 \times (\frac{1}{3})$, respectively, with respect to the movement direction of the image bearing member, where $l_1$ is a distance between the line b and the starting end $a_1$.

In order to form the magnetic field having a peak g of the magnetic confining force downstream of a peak g of the perpendicular magnetic flux density with respect to the image bearing member movement direction as shown in FIGS. 4, 5 and 6, it is desired that the perpendicular magnetic flux density distribution satisfies $W2 = \beta_2/\alpha_2 \geq 0.5$. In order to form a magnetic field having a peak 1 of the magnetic confining force upstream of the peak e of the perpendicular magnetic flux density as shown in FIGS. 5 and 6, the perpendicular magnetic flux density distribution is desired to satisfy $W1 = \beta_1/\alpha_1 \geq 0.5$. Further preferably, W1 and W2 are not less than 0.65.

Here, $\alpha_1$, $\alpha_2$, $\beta_1$ and $\beta_2$ are angles seen from the rotational center of the sleeve.

Figure 8:
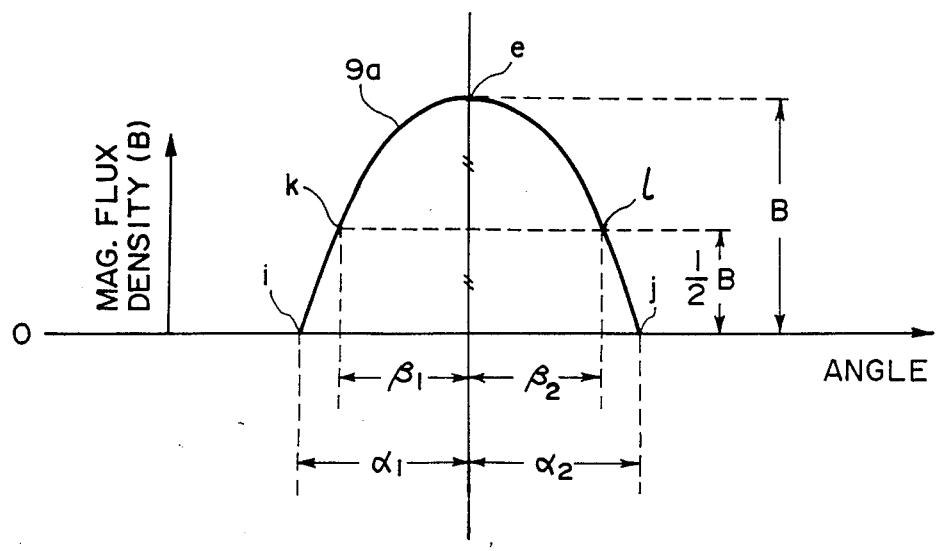
FIG. 8 illustrates the density distribution of the perpendicular component of the magnetic flux.

As shown in FIG. 8, $\alpha_1$, $\alpha_2$, $\beta_1$ and $\beta_2$ are such angles between points i and e, between points e and j, between points k and e and between points e and l, respectively. The point i is the point upstream of the point e with respect to the image bearing member movement direction where the perpendicular magnetic flux density $9a$ is 0; the point j is a point downstream of the point e where the perpendicular magnetic flux density $9a$ is 0; and points k and l are points where the perpendicular magnetic flux density $9a$ is one half that at the peak e.

In the foregoing embodiments, the sleeve 2 rotates to provide the same peripheral movement as the image bearing member B in the developing zone a. However, it may be rotated in the opposite direction. The ratio of the speeds of the sleeve 2 and the image bearing member B can be properly set to provide a desired density of the developed image.

The magnetic flux density distribution and the magnetic confining force distribution described above can be provided by one or more of bonding plural magnets in proper orientation, magnetizing a magnetic member in a form of a roller in proper pattern, partly cutting the magnet produced in the above manner and forming one or more grooves therein. In any case, the profile of the magnetic confining force distribution is dependent on the profile of the magnetic flux density distribution.

The present invention is applicable to a non-contact type developing apparatus using two component developer containing magnetic carrier particles and non-magnetic toner particles wherein a layer of the developer is formed into a thickness smaller than the minimum clearance between the image bearing member and the sleeve. In this case to, the alternating electric field is formed in the developing zone. When the present invention is incorporated, the behavior of the magnetic carrier particles is properly controlled to reduce the tails and scattered spots.

Figure 9A:
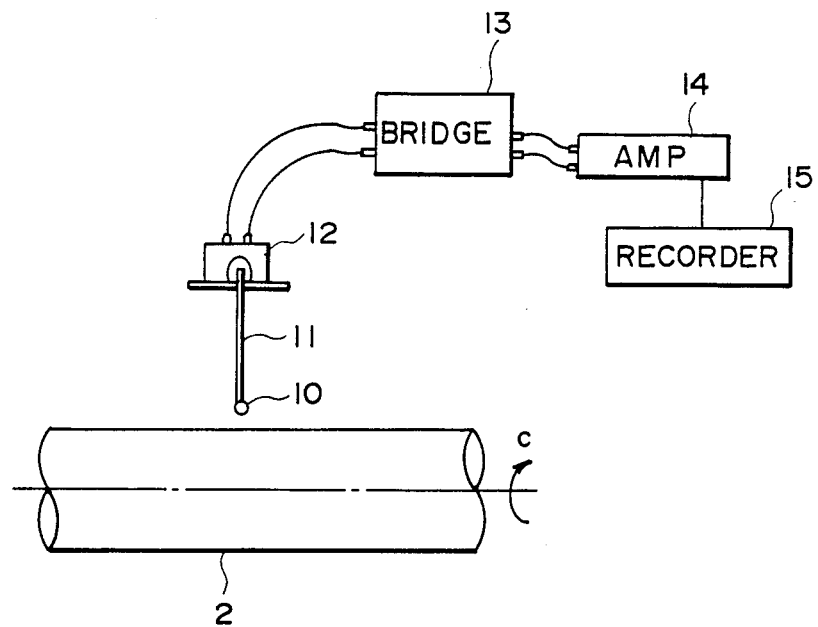
FIGS. 9A and 9B illustrates an example of a measuring method of the perpendicular magnetic confining force.
Figure 9B:
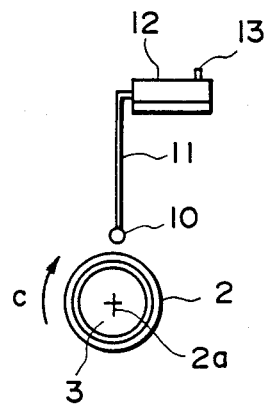

Referring to FIGS. 9A and 9B, the description will be made as to the method of measuring the magnetic confining force. A small spherical ball 10 of magnetic material is disposed adjacent to the developing sleeve 2. The ball 10 is fixed on a thin shaft of non-magnetic material. The shaft 11 extends along a vertical line passing through an axis of the developing sleeve as shown in FIG. 9B. The other end of the shaft 11 is fixed and connected to a strain gauge 12. The magnetic ball 10 is so adjusted that it is sensitive only to a component, in the direction perpendicular to the surface of the sleeve, of the magnetic confining force provided by the magnetic field formed by the magnetic field generating means 3 in the developing sleeve. In the developing sleeve 2, the above-described stationary magnet $3a$, $3b$, $3c$ and $3d$ are mounted for relative coaxial rotation. The distribution, along the circumferential periphery of the sleeve, of the magnetic confining force is measured while the magnet is rotated coaxially with the sleeve 2. The output of the strain gauge 12 is connected to an amplifier through a bridge 13. The amplifier 14 is connected with a recorder 15 so that the distribution along the circumference can be recorded in accordance with the output indicative of the perpendicular magnetic confining force.

In the actual measurement, the magnetic ball 10 was made of ferrite and had a diameter approximately 1 mm, and the shaft 11 was made of a stainless steel rod having a diameter of 1 mm (non-magnetic). The clearance between the magnetic ball 10 and the sleeve 2 was set approximately 0.5 mm. The strain gauge 12 was 120 T-5B available from KYOWA DENGYO KABUSHIKI KAISHA, Japan; the amplifier 14 was DPM-305A available from the same; and the recorder 15 was XY-PLOTTER FP5301R available from GRAPHTEC, INC.

The configurations or profiles F and F' of the distribution of the magnetic confining force (in the perpendicular direction) adjacent the developing pole are obtained through the above-described method of measurement.

It would be the best if the magnetic ball 10 is a toner particle actually used in the development, but the actual toner particles have a diameter of approximately 10 microns which is too small, and the force received by the toner is so small that a sufficiently sensitive strain gauge 12 is not available at present.

In this measuring method, the output changes with the change of the distance between the magnetic ball 10 and the developing sleeve 2. However, the distribution profile is substantially an analogous even if the distance is changed by 0-2 mm.

In this range of the distance, the distance 0 mm means that the developing sleeve is removed to expose the magnet, and then the measurement is carried out.

Therefore, in the developing zone a in the actual developing device, the distance between the image bearing member B and the developing sleeve 2 is approximately 50 microns −1 mm, and the magnetic flux density distribution measured under those conditions is an analogous distribution of the force applied to the toner at the time of the actual development action. More particularly, when the magnetic ball 10 is a ferrite ball having a diameter of approximately 1 mm, and the clearance between the ferrite ball 10 and the developing sleeve 2 is 0.5 mm upon the measurement of the magnetic confining force, the force received by the ferrite ball is not exactly the same as the force received by a toner particle, but it exhibits an analogous circumference distribution in the magnetic confining force received by the toner particle.

As described in the foregoing, according to the present invention, the tails and scattered spots are prevented from being produced. In addition, other deteriorations of the image are prevented such as reduction of an image density of a fine line extending in a direction perpendicular to the movement direction of the image bearing member, thinning of a fine line and increase of an image density at a trailing edge portion of the solid black image which occur in the development.

While the invention has been described with reference to the structures disclosed herein, it is not confined to the details set forth and this application is intended to cover such modifications or changes as may come within the purposes of the improvements or the scope of the following claims.

What is claimed is:

1. A developing apparatus for developing an electrostatic latent image formed on a movable image bearing member, comprising:
a rotatable developer carrying member for carrying a developer into a developing zone where an image bearing member and said developer carrying member are faced and where the electrostatic latent image on the image bearing member is developed;
a magnet stationarily disposed in said developer carrying member, wherein said magnet forms in said developing zone such a magnetic field that a peak position of a magnetic flux density of the magnetic field in a direction perpendicular to a surface of said developer carrying member is in said developing zone, and wherein a magnetic confining force in the perpendicular direction in said developing zone is so distributed that it is stronger downstream of a position where the image bearing member and said developer carrying member are closest with respect to a movement direction of the image bearing member than at the closest position.

2. An apparatus according to claim 1, wherein a position of a peak of the magnetic confining force is downstream of a position of a peak of said magnetic flux density with respect to the movement direction.

3. An apparatus according to claim 2, wherein the position of the peak of the magnetic confining force is adjacent an ending position of said developing zone.

4. An apparatus according to claim 1, 2 or 3, further comprising a regulating member for regulating a thickness of a developer layer carried into said developing zone by said developer carrying member into a thickness smaller than a minimum clearance between the image bearing member and said developer carrying member.

5. An apparatus according to claim 4, further comprising a voltage source for applying a bias voltage including an AC component to said developer carrying member.

6. A developing apparatus for developing an electrostatic latent image formed on a movable image bearing member, comprising:
a rotatable developer carrying member for carrying a developer into a developing zone where an image bearing member and said developer carrying member are faced and where the electrostatic latent image on the image bearing member is developed;
a magnet stationarily disposed in said developer carrying member, wherein said magnet forms in said developing zone such a magnetic field that a peak position of a magnetic flux density of the magnetic field in a direction perpendicular to a surface of said developer carrying member is in said developing zone, and wherein a magnetic confining force in the perpendicular direction in said developing zone is so distributed that it is stronger downstream and upstream of a position where the image bearing member and said developer carrying member are closest with respect to a movement direction of the image bearing member than at the closest position.

7. An apparatus according to claim 6, wherein a position of a peak of the magnetic flux density is between a position of a first peak of the magnetic confining forces upstream of the closest position with respect to the movement direction and a position of a second peak thereof downstream of the closest position.

8. An apparatus according to claim 7, wherein the position of the first peak is adjacent to a starting position of said developing zone, and the position of the second peak is adjacent to an ending position of said developing zone.

9. An apparatus according to claim 6, 7 or 8, further comprising a regulating member for regulating a thickness of a developer layer carried into said developing zone by said developer carrying member into a thickness smaller than a minimum clearance between the image bearing member and said developer carrying member.

10. An apparatus according to claim 9, further comprising a voltage source for applying a bias voltage including an AC component to said developer carrying member.

11. A developing apparatus for developing an electrostatic latent image formed on a movable image bearing member, comprising:
  a rotatable developer carrying member for carrying a developer into a developing zone where an image bearing member and said developer carrying member are faced and where the electrostatic latent image on the image bearing member is developed;
  a magnet stationarily disposed in said developer carrying member, wherein said magnet forms in said developing zone such a magnetic field that a peak position of a magnetic flux density of the magnetic field in a direction perpendicular to a surface of said developer carrying member is in said developing zone, and wherein a magnetic confining force in the perpendicular direction in said developing zone is so distributed that it is stronger downstream of a position of a peak of the magnetic flux density than at the position of the peak.

12. An apparatus according to claim 11, wherein the position of the peak of the magnetic confining force is adjacent an ending position of said developing zone.

13. An apparatus according to claim 11 or 12, further comprising a regulating member for regulating a thickness of a developer layer carried into said developing zone by said developer carrying member into a thickness smaller than a minimum clearance between the image bearing member and said developer carrying member.

14. An apparatus according to claim 13, further comprising a voltage source for applying a bias voltage including an AC component to said developer carrying member.

15. A developing apparatus for developing an electrostatic latent image formed on a movable image bearing member, comprising:
  a rotatable developer carrying member for carrying a developer into a developing zone where an image bearing member and said developer carrying member are faced and where the electrostatic latent image on the image bearing member is developed;
  a magnet stationarily disposed in said developer carrying member, wherein said magnet forms in said developing zone such a magnetic field that a peak position of a magnetic flux density of the magnetic field in a direction perpendicular to a surface of said developer carrying member is in said developing zone, and wherein a magnetic confining force in the perpendicular direction in said developing zone is so distributed that it is stronger upstream and downstream of a position of a peak of the magnetic flux density with respect to a movement direction of the image bearing member than at the position of the peak.

16. An apparatus according to claim 15, wherein the position of the first peak is adjacent to a starting position of said developing zone, and the position of the second peak is adjacent to an ending position of said developing zone.

17. An apparatus according to claim 15 or 16, further comprising a regulating member for regulating a thickness of a developer layer carried into said developing zone by said developer carrying member into a thickness smaller than a minimum clearance between the image bearing member and said developer carrying member.

18. An apparatus according to claim 17, further comprising a voltage source for applying a bias voltage including an AC component to said developer carrying member.

* * * * *

UNITED STATES PATENT AND TRADEMARK OFFICE
CERTIFICATE OF CORRECTION

PATENT NO. : 4,960,070

DATED : October 2, 1990

INVENTOR(S) : MATSUOMI NISHIMURA

It is certified that error appears in the above-identified patent and that said Letters Patent is hereby corrected as shown below:

COLUMN 1

Line 4, "THE AND" should read --THE INVENTION AND--.
    Line 48, "used" should read --is used--.

COLUMN 2

Line 59, "illustrates" should read --illustrate--.

COLUMN 3

Line 43, "formed" should read --forms--.
    Line 65, "Magnet 3c and 3d" should read --Magnets 3c and 3d--.

COLUMN 4

Line 35, "sleeve 28" should read --sleeve 2--.

COLUMN 5

Line 29, "conveying poles 3b and 3d." should read --conveying poles 3c and 3d.--.
    Line 57, "circumferential" should read --circumference--.

COLUMN 6

Line 28, "is" should read --are--.

UNITED STATES PATENT AND TRADEMARK OFFICE
CERTIFICATE OF CORRECTION

PATENT NO. : 4,960,070
DATED : October 2, 1990
INVENTOR(S) : MATSUOMI NISHIMURA

Page 2 of 2

It is certified that error appears in the above-identified patent and that said Letters Patent is hereby corrected as shown below:

COLUMN 8

Line 58, "stationary magnet 3a, 3b," should read --stationary magnets 3a, 3b,--.

COLUMN 9

Line 26, "an" should be deleted.

Signed and Sealed this

Twenty-second Day of September, 1992

Attest:

DOUGLAS B. COMER

*Attesting Officer*    *Acting Commissioner of Patents and Trademarks*